Patented Oct. 23, 1928.

1,688,873

UNITED STATES PATENT OFFICE.

NORMAN M. McGRANE, OF LONG BEACH, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR RECOVERY OF POTASSIUM CHLORIDE.

No Drawing.     Application filed May 4, 1927. Serial No. 188,865.

This invention relates to the recovery of potassium chloride from materials containing chlorides and sulphates of potassium and sodium, and particularly from cement kiln dust, that is from the dust separated in any suitable manner from the exit gases arising from kilns employed in the burning of Portland cement. Certain types of such cement dust have been found to consist largely of chlorides and sulphates of potassium and sodium, probably chiefly in the form of potassium sulphate and sodium chloride.

The principal object of this invention is to recover from a material of this type a salt which consists principally of potassium chloride, and which contains a minimum amount of sodium sulphate and other impurities.

A further object of the invention is to produce such a salt by means of a simple sequence of operations and at a minimum cost.

I have found that if a cement kiln dust containing the above mentioned constituents is subjected to a leaching operation with a suitable amount of an aqueous solvent at a suitable temperature, all of these constituents at first gradually go into solution, and that the concentrations of sodium, potassium, sulphate, and chloride all increase up to a certain point, but that continued leaching causes a further increase in the concentration of potassium and chloride, accompanied by a decrease in the concentration of sodium and sulphate, so that by continuing the leaching at a suitable temperature and for a sufficient period of time, a solution can be obtained which contains a high concentration of potassium chloride in solution with a reduced concentration of sodium sulphate, such reduced concentration of sodium sulphate being lower than the concentration of such salt during a preceding stage of the leaching operation. This lowering of the solubility of the sodium sulphate may be due to what is known as mass action, that is to say, the increase in concentration of potassium and chloride ions in the solution causes the solubility of sodium and sulphate ions to be reduced and consequently these latter ions recombine and precpitate. I have also found that when the solution resulting from such a leaching operation is cooled to a temperature materially below the leaching temperature the solubility of potassium chloride therein decreases, while the solubility of sodium sulphate remains substantially constant or increases due to the removal of potassium and chloride ions. A precipitate is thus obtained upon cooling which consists principally or substantially wholly of potassium chloride, with only a very minute quantity of sodium sulphate and other salts.

The process of my present invention consists essentially in leaching a material containing the above named constituents with a suitable amount of an aqueous solvent at a super-atmospheric temperature, for example at the boiling point of the solution or about 100–110° C., until the solution becomes saturated with respect to sodium and sulphate and the concentrations of these constituents decrease while the concentrations of potassium and chloride are still increasing, then separating the resulting solution from the undissolved and precipitated solid material, cooling such solution to a temperature materially below the leaching temperature, for example to 30° C. or below, to cause precipitation of a salt consisting principally of potassium chloride, and separating such precipitate from the solution or mother liquor. The aqueous solvent which is employed in the leaching operation may consist of water, but in order to minimize the loss of potassium chloride from the process and also to decrease the time required in the leaching operation, I prefer to use the mother liquor remaining after crystallization of the potassium chloride salt as the aqueous solvent for leaching further quantities of the material. As a result of this method of operation the potassium chloride remaining in the mother liquor is retained in the process and furthermore, due to the fact that such mother liquor is already substantially saturated with sodium and sulphate, only a minimum quantity of sodium and sulphate need be dissolved in the further leaching operation before complete saturation with respect to those constituents is obtained, thus reducing both the heat requirement and the time of such leaching operation.

The proportion of solvent to original dust may be varied somewhat, but I have found that in general the use of a high proportion of solvent tends to give a high yield of finished salt but decreases the purity thereof, while the use of a low proportion of solvent decreases the yield but increases the purity. In general, therefore, the proportion of solvent used should be such as to give the maximum yield consistent with satisfactory purity, that is, a sufficiently high potassium chloride content. The proportion of solvent to cement kiln dust may be varied, for example, between one and three and one-half cubic centimeters of solvent per gram of dust, although I have found that a proportion of about two to three cubic centimeters per gram appears to give the best results.

The most suitable time of leaching will depend upon the conditions in different cases, but I have found that leaching for a period of from one to two hours gives good results in certain cases, and the results I have obtained indicate that with the proportions of solvent used, this period should be at least 40 minutes, the time of leaching being a function of the amount and the degree of saturation of the leaching medium.

As an example of one particular method of carrying out this process, a 600 gram sample of cement kiln dust was leached at boiling temperature with 1400 cc. of brine or mother liquor resulting from a preceding leaching and potassium chloride crystallization. This dust was taken from a batch which was found to contain 80.39% water soluble material, and this water soluble material had approximately the following composition:

TABLE I.

*Analysis of water-soluble portion.*

| | Per cent. |
|---|---|
| $K_2O$ | 20.8 |
| Cl | 37.5 |
| $SO_3$ | 14.9 |
| Undetermined | 26.8 |

The remainder of this water-soluble material consisted principally of sodium with a small amount of calcium. The leaching operation was continued for a period of one hour and samples of the solution were removed from time to time and analyzed for chloride, sulphate, and potash concentration. The results of these analyses are given below together with a similar analysis of the solvent in this process. The concentration of sodium is also given, as calculated from the other concentrations, assuming that the four constituents are alone present in the solution, an assumption which under the circumstances is sufficiently accurate for practical purposes.

TABLE II.

*Results of leaching test.*

[Mother liquor from preceding run used as solvent.]

| Time of leaching | Concentrations, in gms. per cc. | | | |
|---|---|---|---|---|
| | $Cl^-$ | $SO_4^=$ | $K^+$ | $Na^+$ |
| Solvent | .203 | .0269 | .0836 | .0957 |
| 10 min | .227 | .0398 | .106 | .104 |
| 15 min | .233 | .0408 | .109 | .106 |
| 20 min | .230 | .0389 | .109 | .103 |
| 30 min | .228 | .0374 | .111 | .100 |
| 45 min | .235 | .0341 | .115 | .101 |
| 60 min | .236 | .0312 | .119 | .0978 |

The figures in the above table show clearly that while the potassium and chloride concentration continued to increase throughout the leaching period, the sodium and sulphate concentrations reached a maximum at some time between 10 and 15 minutes after the start of the leaching operation and then decreased, until the concentrations of these constituents at the end of the leaching operation were but very little higher than in the original solvent. It is also evident that the solution at the end of the one hour's leaching operation contained a much greater relative proportion of potassium and chloride as compared with sodium and sulphate than did the solution at the time when the sodium and sulphate concentrations were at a maximum, or at any point from zero to 30 minutes. It is apparent therefore that a much purer precipitate of potassium chloride can be obtained by cooling the solution obtained by an hour's leaching than from the solution obtained by a less prolonged leaching, for example 10 to 20 minutes.

In the present instance the solution was removed from the solid material at the end of the one hour's leaching operation and such solution was then cooled to about 18–20° C. Upon cooling a salt crystallized consisting principally of potassium chloride. This salt was separated from the mother liquor by centrifuging. The amount of the precipitate so obtained was 64 grams, and analysis thereof showed that it contained 47.85% chloride, 62.58% potassium expressed as $K_2O$ and 2.5% sulphate expressed as $SO_3$.

As evidence of the fact that the prolonged period of leaching actually enabled a purer potassium chloride to be obtained, it may be stated that a sample of solution was removed after 30 minutes leaching, and was treated in the same manner to recover potassium chloride therefrom. The salt thus obtained contained 40.5% chloride, 59.2% $K_2O$ and 8.3% $SO_3$. As compared with the preceding analysis, it is seen that this latter salt was lower in both potassium and chloride and contained over three times as much sulphate.

Instead of using pure mother liquor as a solvent in the leaching operation, I may use a solvent consisting in part of mother liquor and in part of fresh water or of water previously used in washing the potassium chloride crystals or in re-leaching the solid residue remaining after the first leaching operation. As an example, a batch of 600 gms. of material was leached at the boiling point with a solvent consisting of 85% mother liquor from a preceding run and 15% water. The following figures will serve to indicate the progress of the various concentrations in this case.

TABLE III.

| Time of leaching | Concentrations, in gms. per cc. | | | |
|---|---|---|---|---|
| | Cl⁻ | SO₄⁼ | K⁺ | Na⁺ |
| Solvent | .173 | .0228 | .071 | .081 |
| 20 min | .231 | .0418 | .108 | .153 |
| 40 min | .234 | .0369 | .113 | .149 |
| 60 min | .236 | .0347 | .121 | .144 |

Here again it is seen that during the latter part of the leaching operation the sodium and sulphate concentrations decreased while the potassium and chloride concentrations continued to increase. The solution at the end of the one hour's leaching period was again removed and cooled, and the resulting precipitate separated by centrifuging. A total of 80 gms. of salt was obtained, which contained 47.7% Cl, 62.9% $K_2O$, and 0.3% $SO_3$, or substantially a pure KCl.

In practice it will in general be necessary to add water to the mother liquor from each cycle in order to provide the necessary amount of solvent for the next cycle, to make up for mechanical losses in the process. As stated above, I may in some cases add for this purpose a solution resulting from a second leaching of the solid residuum remaining after the first leaching. This procedure is of particular advantage as it not only permits the recovery of an additional quantity of potash but also causes the leaching solvent to be already practically saturated with respect to sodium and sulphate the beginning of each primary leaching operation.

I claim:

1. The process for recovery of potassium chloride from materials containing chlorides and sulphates of potassium and sodium which comprises leaching such material with an aqueous solvent at a super-atmospheric temperature, continuing such leaching operation until the concentrations of sodium and of sulphate reach maximum values and then decrease materially below said maximum values while the concentrations of potassium and chloride continue to increase, separating the resulting solution from the solid material, cooling such solution to a temperature materially below the leaching temperature to cause precipitation of a salt consisting principally of potassium chloride, and then separating such salt from the mother liquor.

2. The process as set forth in claim 1, the aqueous solvent used in the leaching operation consisting in part at least of mother liquor obtained from a preceding cycle of the process.

3. The process as set forth in claim 1, the aqueous solvent used in the leaching operation consisting principally of mother liquor obtained from a preceding cycle of the process, and the remainder of said aqueous solvent consisting in part at least of a solution resulting from a second leaching with hot water of the solid material remaining after the first leaching operation.

4. The process for recovery of potassium chloride from materials containing chlorides and sulphates of potassium and sodium, which comprises leaching such a material with an aqueous solvent at approximately the boiling point of the solvent, continuing such leaching operation until the solution becomes saturated with respect to sodium and sulphate and the concentration of such constituents decreases due to increasing concentration of potassium and chloride, separating the resulting solution from the solid material, cooling such solution to a temperature materially below the leaching temperature to cause precipitation of a salt consisting principally of potassium chloride, and then separating such precipitate from the mother liquor.

5. The process as set forth in claim 4, said leaching operation being continued for a period of at least 40 minutes.

6. A process as set forth in claim 4, said leaching operation being continued for from one to two hours.

7. The process as set forth in claim 4, the aqueous solvent used in the leaching operation consisting in part at least of mother liquor obtained from a preceding cycle of the process.

8. The process as set forth in claim 4, the aqueous solvent used in the leaching operation consisting principally of mother liquor obtained from a preceding cycle of the process, and the remainder of said aqueous solvent consisting in part at least of a solution resulting from a second leaching with hot water of the solid material remaining after the first leaching operation.

9. The process as set forth in claim 4, in which the temperature to which the solution is cooled is below about 30° C.

In testimony whereof I have hereunto subscribed my name this 27th day of April, 1927.

NORMAN M. McGRANE.